(No Model.)

F. CLENCH & T. S. KING.
SPRING TIRE FOR WHEELS.

No. 587,794. Patented Aug. 10, 1897.

WITNESS:
J H Richard Wobse
Otto Ulmer

INVENTORS:
Frederick Clench
Thomas Scott King
by Revarius
Attys

UNITED STATES PATENT OFFICE.

FREDERICK CLENCH AND THOMAS SCOTT KING, OF CHESTERFIELD, ENGLAND.

SPRING-TIRE FOR WHEELS.

SPECIFICATION forming part of Letters Patent No. 587,794, dated August 10, 1897.

Application filed January 22, 1897. Serial No. 620,260. (No model.)

*To all whom it may concern:*

Be it known that we, FREDERICK CLENCH, engineer, residing at Lincoln Works, Chesterfield, and THOMAS SCOTT KING, engineer, residing at Stanley Street, Chesterfield, England, citizens of Great Britain, have invented certain new and useful Improvements in Spring-Tires for Wheels, of which the following is a specification.

Our invention relates to spring-tires for vehicle-wheels; and our object is to provide a spring-tire of great durability for traveling wheels, which spring-tire is so constructed as to minimize shock and at the same time avoid absorption of power in the course of its operation.

Our invention consists in forming a spring-tire of a coiled spring of steel or other sufficiently elastic metal, the metal used for forming such coil being of a suitable section to cause interlocking. Our tire consists, in fact, of a spiral or helical spring in which each coil interlocks with its neighbor, this interlocking spiral spring being laid round a suitably-shaped rim of a wheel and covered with rubber or other like material.

The accompanying sheet of drawings illustrates our invention according to several modifications.

Figure 4:
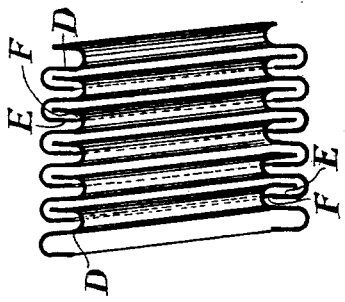
Figure 3:
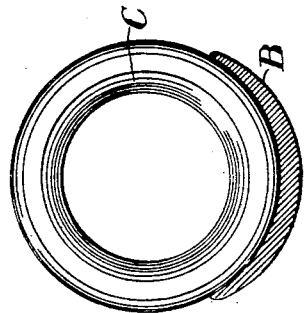
Figure 2:
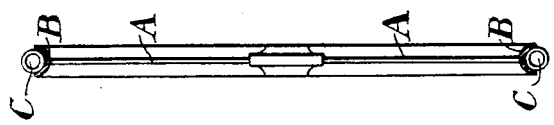
Figure 1:
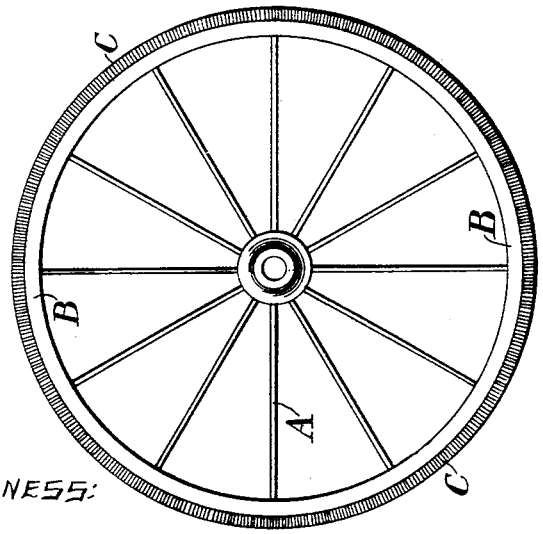

Figures 1 and 2 show, respectively, an elevation and section of a carriage-wheel constructed in accordance with our invention. Figs. 3 and 4 are respectively an end view and cross-section of a portion of our improved spring-tire. Figs. 5 to 11, inclusive, illustrate cross-sections of different forms of our improved spring-tire.

In carrying our invention into effect according to one modification we construct a wheel, such as A, Figs. 1 and 2, having a semicircular concave rim B. (Shown clearly on a larger scale at Fig. 3.) The rim B may be of metal or other suitable material and may be connected to the wheel-boss by metal spokes. To lay into this concave rim B we form a helical or spiral spring C from a ribbon or band of S-shaped section, as shown at Fig. 4 and on an increased scale at Fig. 5, the S-sections being marked D D. We so coil this ribbon or band that the projection E of one edge of the ribbon is coiled within the inclosing recess F of the other edge. This is clearly shown in Figs. 4 and 5. By so coiling our spring we form a spiral spring with interlocking edges. This spiral spring we lay round the concave rim B of the wheel A and attach the ends so as to form a continuous circular tire. Before or after mounting in position we cover or partly cover our spiral-spring tire D with india-rubber and canvas or other suitable combination to produce a uniform exterior surface.

Figure 11:
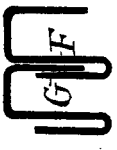
Figure 10:
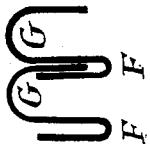
Figure 6:
Figure 5:
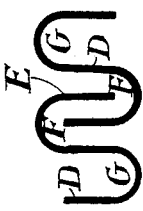
Figure 9:
Figure 8:
Figure 7:
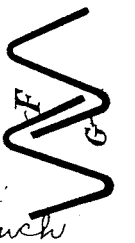

The section of ribbon used by us to form our helical tire may be varied in many ways, and a number of these variations are shown in the accompanying sheet of drawings, Figs. 5 to 11, inclusive. The two parts forming the opposing and interlocking portions, such as G F, Fig. 5, may be, as shown there, of equal dimensions and configuration, or the part F of the coil, as shown in Fig. 10, may be narrower than the other part G, in which case the adjoining coils lock more closely. The turning part of the S may be rounded or may be flattened with round edges, as shown at Figs. 6 and 11, or the S may be of V outline—that is, formed of two V's placed together, as shown at Fig. 7. The interlocking may be performed without the double-S or double-V section. Two spiral springs may be coiled. One forms the ribbon of the deep trough section, while the other forms the interlocking edges to connect these troughs. This method is illustrated at Figs. 8 and 9. At Fig. 8, H H are coils of a spiral ribbon carrying the trough-spaces I I, while J is one coil of the second spiral ribbon carrying the interlocking portion K K. Fig. 9 is a simpler form of Fig. 8, on which I I also denote the troughs and K K the interlocking portions.

We do not confine ourselves to any particular section, although we consider that the sections we have given are best suited for our purpose. We may, however, vary the section to any desired extent, so long as we provide a spring-tire formed of a coil or spiral laid round the circumference of the wheel, the said coil or spiral being of such section as to interlock each coil with the other. When we make the outer spring-coil separate from the connecting-coil, we interlock the two edges of the outer coil by coiling or screwing within it the inner interlocking coil formed separably.

By the use of our invention we produce a tire of great elasticity and superior durability, which at the same time is free from all troubles caused in the pneumatic tires by puncturing.

Our tire is applicable generally to vehicle-wheels, but we consider it to have special advantages for the purposes of motor-carriages, where a really durable and reliable wheel is very necessary.

Having thus described our invention, what we claim as new, and desire to secure by Letters Patent, is—

A tire for a vehicle comprising convolutions of channeled material, the flanges of said channeled material interlocking laterally and leaving a free space between their edges and the bottom of the troughs in which they lie so that the said convolutions will be free to have resilience laterally of the axial line of said convolutions and independent of each other, substantially as described.

In witness whereof we have hereunto set our hands in presence of two witnesses.

FREDERICK CLENCH.
THOMAS SCOTT KING.

Witnesses:
S. McDABRIN CLENCH,
ERNEST WILLIAM WHATTAM.